(12) United States Patent
Brock

(10) Patent No.: US 8,888,375 B2
(45) Date of Patent: Nov. 18, 2014

(54) OVERMOLDED CAGE

(71) Applicant: Schaeffler Technologies AG & Co. KG, Herzogenaurach (DE)

(72) Inventor: Joseph Brock, Hawthorne, NY (US)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 0 days.

(21) Appl. No.: 13/906,123

(22) Filed: May 30, 2013

(65) Prior Publication Data
US 2013/0336609 A1 Dec. 19, 2013

Related U.S. Application Data

(60) Provisional application No. 61/659,146, filed on Jun. 13, 2012.

(51) Int. Cl.
*F16C 33/44* (2006.01)
*F16C 33/38* (2006.01)
*F16C 19/06* (2006.01)

(52) U.S. Cl.
CPC .......... *F16C 33/3831* (2013.01); *F16C 33/3868* (2013.01); *F16C 33/3862* (2013.01); *F16C 33/3875* (2013.01); *F16C 2300/02* (2013.01); *F16C 19/06* (2013.01)
USPC .......................................... 384/527; 384/530

(58) Field of Classification Search
CPC ............ F16C 33/3831; F16C 33/3862; F16C 33/3868; F16C 33/3875; F16C 33/38; F16C 33/3837; F16C 33/3843; F16C 33/385; F16C 33/3856
USPC .......... 384/523, 525, 528, 529, 534, 572, 573, 384/578, 579, 614, 623, 527, 530
See application file for complete search history.

(56) References Cited

U.S. PATENT DOCUMENTS

| | | | | |
|---|---|---|---|---|
| 1,996,841 A * | 4/1935 | Stevens | ........................ | 384/527 |
| 2,550,912 A * | 5/1951 | Goodwin et al. | ............. | 384/526 |
| 2,712,481 A * | 7/1955 | Martin | ......................... | 384/526 |
| 2,987,350 A * | 6/1961 | Hay | ............................ | 384/470 |
| 3,390,928 A | 7/1968 | Davies et al. | | |
| 4,004,840 A | 1/1977 | Johnston et al. | | |
| 4,073,552 A * | 2/1978 | Christy | ........................ | 384/470 |
| 4,226,484 A * | 10/1980 | Glassow et al. | ............... | 384/470 |
| 4,534,871 A * | 8/1985 | Johnson | ....................... | 508/100 |
| 5,131,762 A | 7/1992 | Waskiewicz | | |
| 5,154,401 A | 10/1992 | Schramm et al. | | |
| 6,247,847 B1 | 6/2001 | Lob | | |
| 8,348,514 B2 * | 1/2013 | Schweitzer | ................... | 384/579 |
| 2009/0220181 A1 * | 9/2009 | Yamada et al. | ............... | 384/513 |

FOREIGN PATENT DOCUMENTS

| | | |
|---|---|---|
| DE | 102009009309 A1 | 8/2010 |
| JP | 2007263279 A | 10/2007 |
| JP | 2008064221 A1 | 3/2008 |
| WO | 2010/066293 A1 | 6/2010 |

OTHER PUBLICATIONS

Great Britain Search Report for GB1307015.6, mailed Oct. 3, 2013 by Great Britain Intellectual Property Office.

* cited by examiner

*Primary Examiner* — Alan B Waits
(74) *Attorney, Agent, or Firm* — Antun M. Peakovic

(57) ABSTRACT

A rolling element guide for a bearing assembly comprising of a steel or other metal skeleton overmolded with a plastic material.

10 Claims, 5 Drawing Sheets

OVERMOLDED CAGE

TECHNICAL FIELD

Example aspects described herein relate to bearing assemblies, particularly of bearing rolling element guides or cages.

BACKGROUND

Bearing assemblies are typically circular in shape, and generally comprise rolling elements sandwiched between raceways in bearing rings. Rolling elements take many forms, including spherical balls, rollers or various other configurations, such as cone-shaped tapered rollers or barrel-shaped spherical rollers. Bearing rolling element guides, or cages, retain rolling elements within a bearing assembly, while typically allowing for free rotation of the rolling elements within the cages, and rotation of the cages within the bearing assembly. Cages can be used to separate rolling elements from each other, generally at equal intervals, and hold rolling elements in alignment with respect to the bearing rings. Depending on the structure of the bearing, or the bearing design, cages may be linear or circular and made from a variety of materials, including, but, not limited to brass, steel, and various types of plastic.

Broadly, there are two main types of bearing cages for so-called conrad or deep groove design bearings; "crown" or "snap" cages; and "ribbon" or "riveted" cages. The "snap" type has an annular side member and axial partitions projecting from said member. These partitions are typically parallel to each other and have open rolling element pockets, allowing said rolling elements to seat or "snap" into position within these open pockets. The "riveted" type is comprised of two pieces or halves, each half with an open pocket to accommodate a rolling element. The halves are assembled on opposite sides of the rolling element, the pockets surrounding the rolling elements, and contact at land surfaces at intervals between rolling elements, then are joined together at the mating surface using various types of fastening elements, such as rivets.

Cages are guided by one of the available surfaces between the inner and outer rings. Cages may be guided by the inner land or surface, wherein, the cage's bore slides, or is guided by, the outer diameter of the inner ring. They may also be guided by the outer land, wherein, the cage's bore slides, or is guided by, the inner diameter of the outer ring. Finally, cage's may touch neither ring, and be guided by the rolling elements themselves.

Some example bearing cages are shown in U.S. Pat. Nos. 6,247,847, 5,154,401 and 4,004,840.

Different types and sizes of bearings require specifically designed bearing cages, taking into account bearing assembly size, operating conditions, and rolling element size, among other factors. It is understood that a particular design of bearing may incorporate a type of cage, but, may require variations in the cage to accommodate the specific bearing, for example choice of rolling element or material used. For example, high speed bearings, particularly with accompanying high operating temperatures or working environments, generally have cages made of steel. Interaction of steel balls in direct contact with steel cages can have negative impacts on wear and temperature. Molded plastic cages have advantages of weight, limitation of particulate generation and pliability relative to steel cages

SUMMARY OF THE INVENTION

A new design for a bearing cage is disclosed. In one example embodiment of the invention, the cage comprises a steel or other metal skeleton overmolded with a plastic material.

BRIEF DESCRIPTION OF DRAWINGS

The above mentioned and other features and advantages of the embodiments described herein, and the manner of attaining them, will become apparent and be better understood by reference to the following description of at least one example embodiment in conjunction with the accompanying drawings. A brief description of those drawings now follows.

DETAILED DESCRIPTION OF THE INVENTION

Identically labeled elements appearing in different ones of the figures refer to the same elements but may not be referenced in the description for all figures. The exemplification set out herein illustrates at least one embodiment, in at least one form, and such exemplification is not to be construed as limiting the scope of the claims in any manner. Radially inward directions are from an outer radial surface of the cage, toward the central axis or radial center of the cage. Conversely, a radial outward direction indicates the direction from the central axis or radial center of the cage toward the outer surface. Axially refers to directions along a diametric central axis. "Cage" and "rolling element guides" are used interchangeably.

Figure 1:
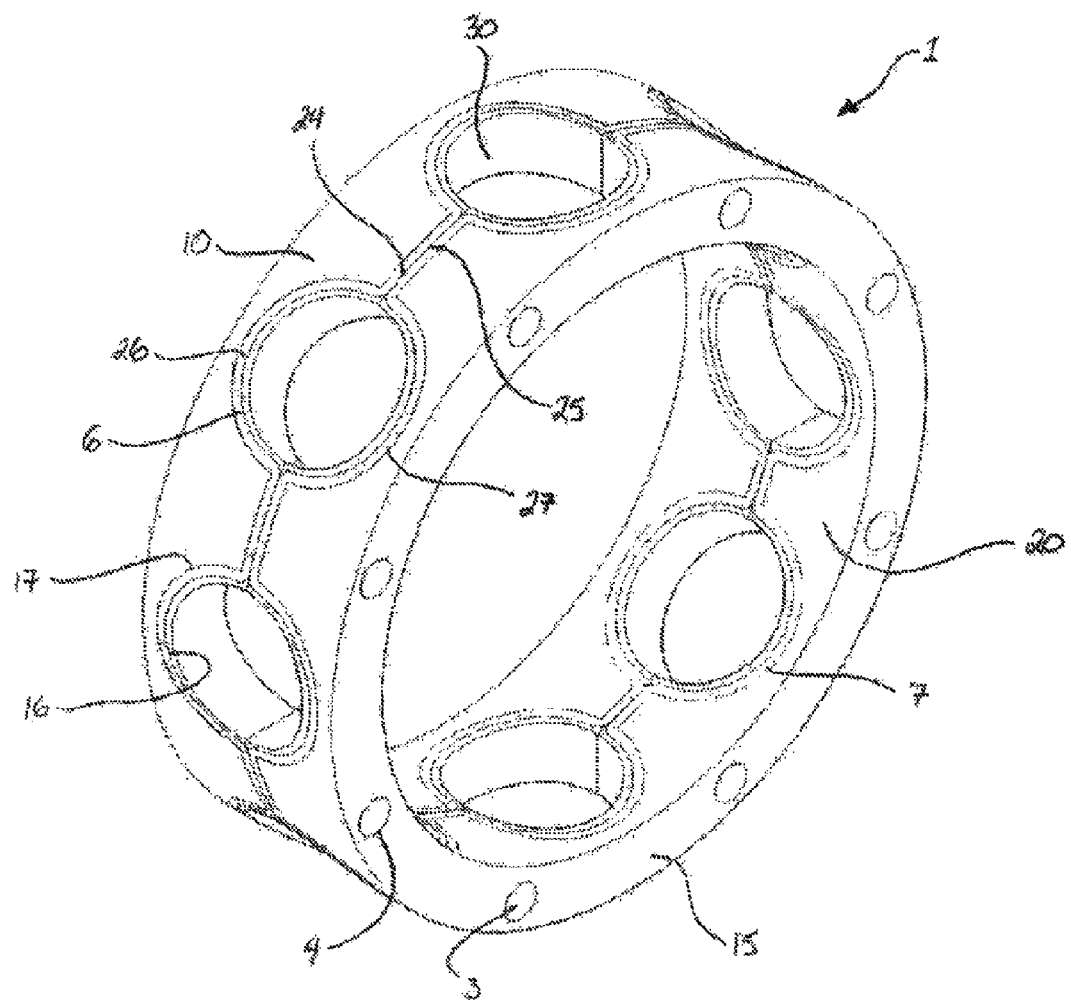
FIG. 1 is a perspective view of a cage assembly according to one example embodiment herein described.
Figure 3:
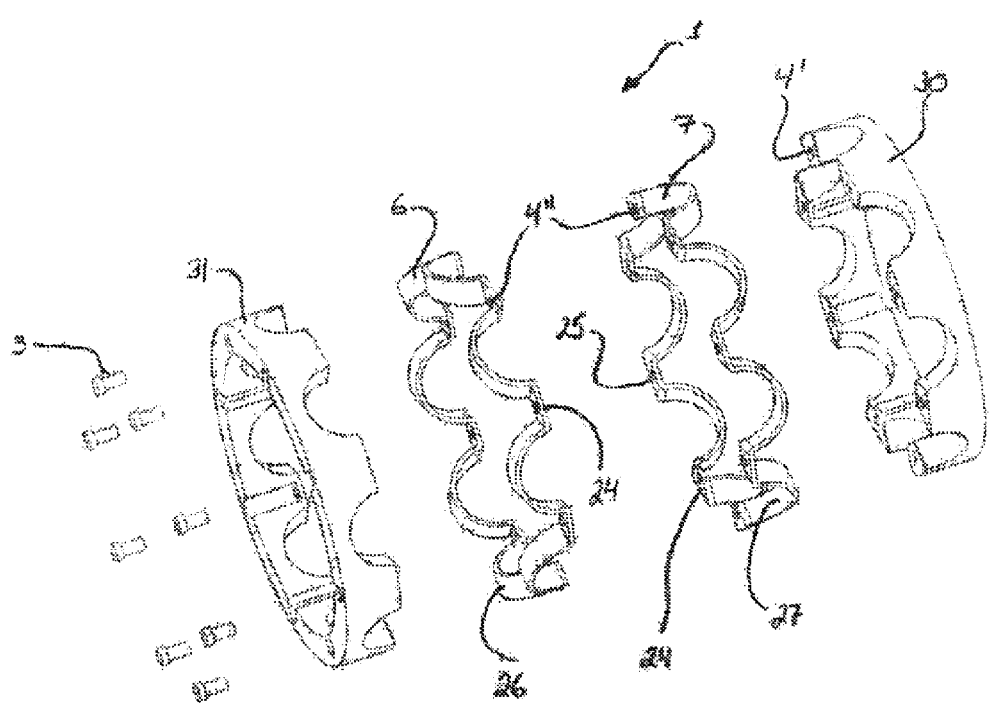
FIG. 3 is an exploded assembly view of the cage assembly of FIG. 1.
Figure 4:
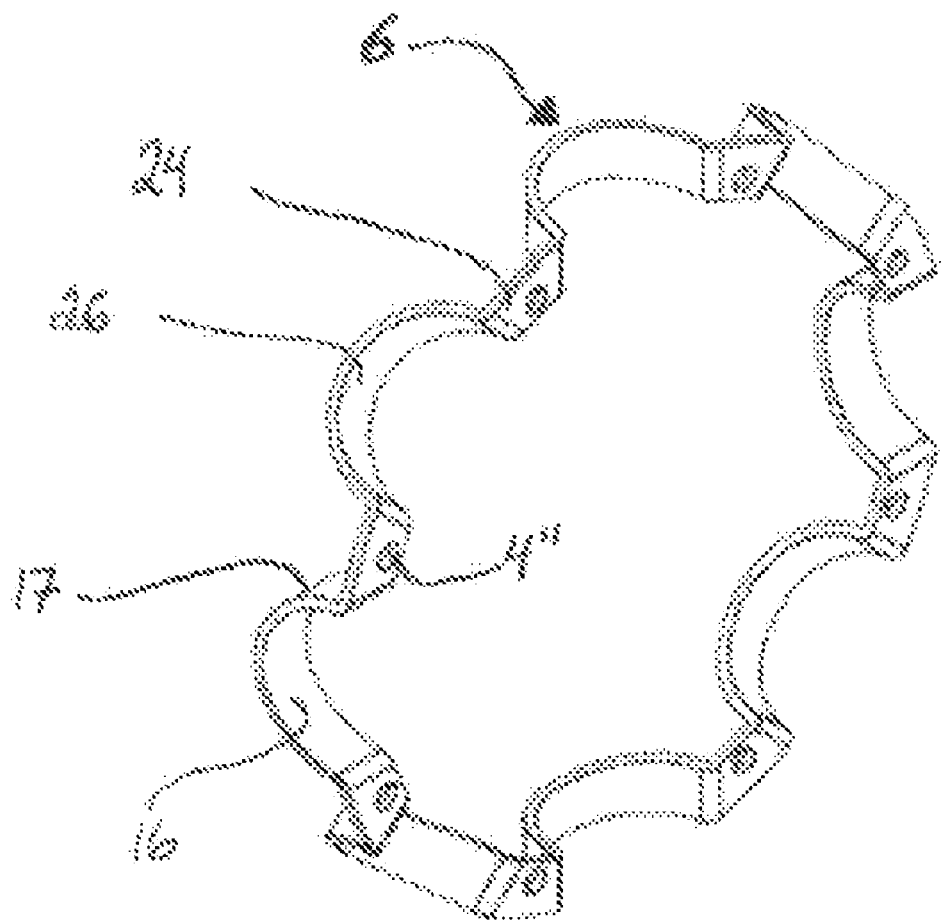
FIG. 4 is a perspective view of a half of the cage skeleton of FIG. 1
Figure 5:
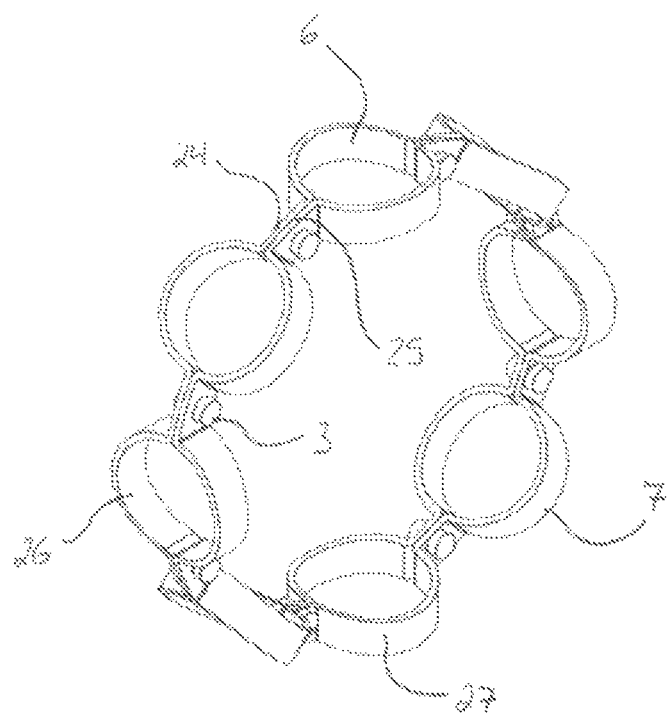
FIG. 5 is a perspective view of the full cage skeleton assembly of FIG. 1.

FIG. 1 is a perspective view of cage assembly 1 according to one example embodiment of the invention. FIG. 3 is an exploded assembly view of the cage assembly of FIG. 1. FIG. 4 is a perspective view of a half of the cage skeleton of FIG. 1, and FIG. 5 is a perspective view of the full cage skeleton of FIG. 1. The following description should be viewed in light of FIGS. 1 through 5. Cage assembly 1 comprises a first half 10 and a second half 20, joined by fastening elements 3, such as rivets, extending through pre-formed holes or perforations 4, extending through an axial length of cage halves 10 and 20, respectively, comprising perforations 4' in overmolded portions 30, 31 and perforations 4" in cage skeletons 6,7. In this embodiment each cage half 10, 20 contains stamped or formed metal cage skeleton 6, 7, respectively. Cage skeletons 6, 7 are formed with multiple assembly land surfaces 24, 25, and complementary multiple arched structures 26, 27, such that, when land surfaces 24, 25 are aligned, arched structures 26, 27 form rolling element pocket 30. In the embodiment shown, rolling element pocket 30 is a circular shape, such as for a ball.

Each cage skeleton 6,7 is, in turn, overmolded with plastic 15, such that at least the axial surfaces 16, 17 (see FIG. 2) are covered with plastic 15, such that plastic 15 forms a bond or is retained to surfaces 16,17 of cage skeletons 6,7. FIG. 3 shows separate overmolded portions 30,31 for illustrative purposes. Although overmolded portions 30, 31 may be separately formed and fixedly secured in cage assembly 1, for example using fastening elements 3, overmolded portions 30, 31 would typically be directly overmolded onto cage skeletons 6,7.

Figure 2:
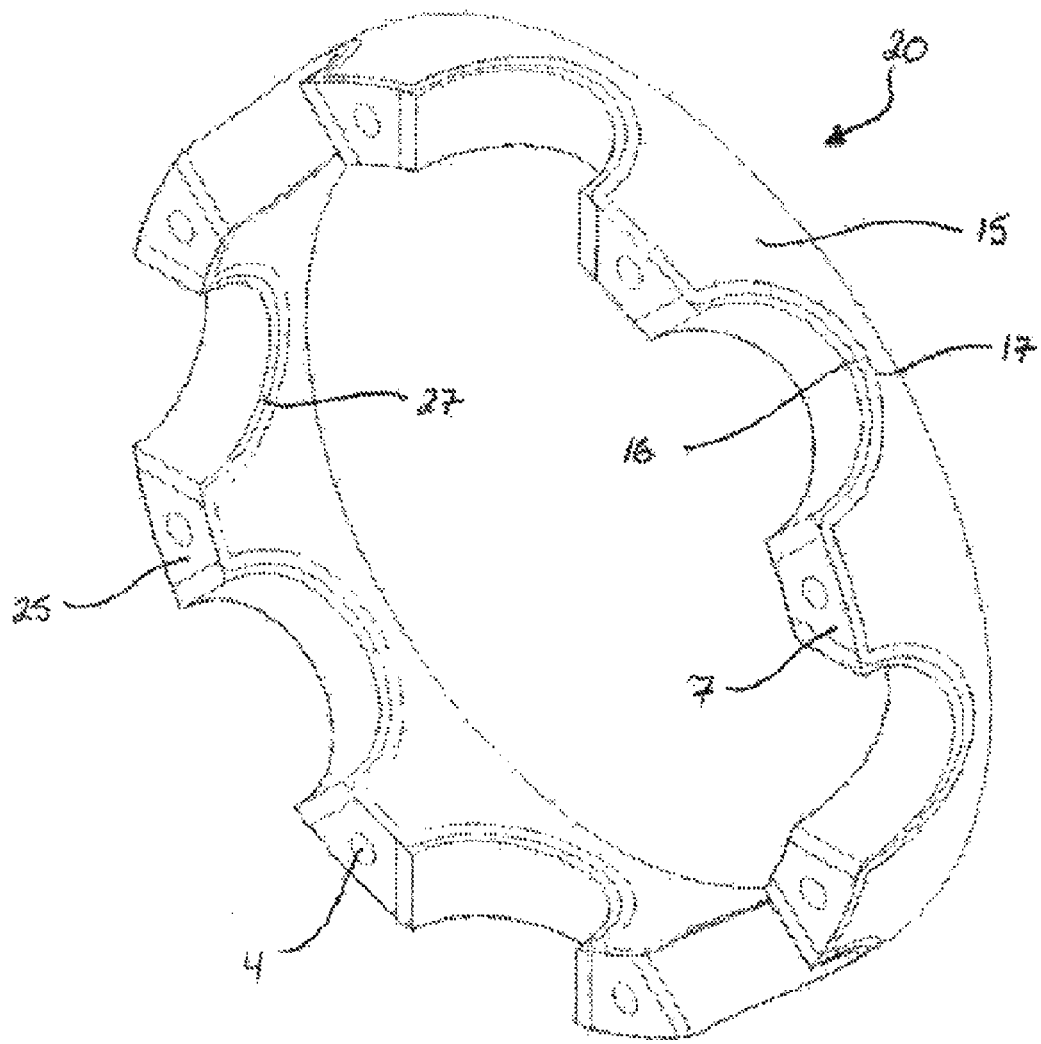
FIG. 2 is a perspective view of one half of the cage assembly of FIG. 1.

FIG. 2 is a perspective view of cage half 20 of cage assembly 1, of FIG. 1. Cage half 10 is a mirror image of cage half 20 and includes the same features. In this example embodiment, cage skeleton 7 is formed of stamped metal, comprising land surfaces 25 and arched structures 27. Cage skeleton 7 is, in turn, overmolded with plastic 15, such as PEEK, bonded or retained to axial surfaces 16 and 17 of cage skeleton 7. Holes 4, extend from an outer axial face through an entire axial thickness of cage half 20, through overmoled plastic 15 of overmolded portion 30, and cage skeleton 7. Land surfaces 24 of complementary cage half 10 aligns with land surfaces 25, the two cage halves 10 and 20 are fixedly assembled together using fastening elements 3 (see FIG. 3).

In the foregoing description, example embodiments are described. The specification and drawings are accordingly to be regarded in an illustrative rather than in a restrictive sense. It will, however, be evident that various modifications and changes may be made thereto, without departing from the broader spirit and scope of the present invention.

In addition, it should be understood that the figures illustrated in the attachments, which highlight the functionality and advantages of the example embodiments, are presented for example purposes only. The architecture or construction of example embodiments described herein is sufficiently flexible and configurable, such that it may be utilized (and navigated) in ways other than that shown in the accompanying figures.

Although example embodiments have been described herein, many additional modifications and variations would be apparent to those skilled in the art. It is therefore to be understood that this invention may be practiced otherwise than as specifically described. Thus, the present example embodiments should be considered in all respects as illustrative and not restrictive.

List of Reference Symbols
1 Cage Assembly
3 Fastening Elements
4 Through Holes or Perforations
4' Overmolded Portion Perforation
4" Cage Skeleton Perforation
6,7 Cage Skeleton
10,20 Cage Half
15 Plastic
16,17 Cage Skeleton Axial Surface
24,25 Land Surface
26,27 Arched Structure
30,31 Overmolded Portions

What I claim is:

1. A rolling element guide for a bearing assembly comprising:
 a first cage half including at least one first metal cage skeleton, the at least one first metal cage skeleton:
  arranged to contact rolling elements; and,
  including a first outer axial surface and a first inner axial surface, at least two first arched segments and at least two first flat land surfaces; and,
 a second cage half including at least one second metal cage skeleton, the at least one second metal cage skeleton:
  arranged to contact rolling elements; and,
  including a second outer axial surface and a second inner axial surface, at least two second arched segments and at least two second flat land surfaces;
 the at least two first and second arched segments are aligned to form rolling element pockets;
 a plastic is retained to at least one of said first outer axial surface or said second outer axis surface;
 the plastic wholly encompasses the at least one of said first outer axial surface or said second outer axial surface around an entire respective circumference of the at least one first or second cage skeleton;
 a series of fastening holes extend through an axial length of the first cage half and through the at least two first flat land surfaces, aligning with fastening holes extending through an axial length of the second cage half and through the at least two second flat land surfaces; and
 a respective fastening elements inserted into each of said fastening holes, align the at least two first and second land surfaces, and fixedly join the first and second cage halves together.

2. The guide of claim 1, wherein said cage skeleton is formed of stamped steel.

3. The guide of claim 1, wherein said plastic is PEEK.

4. The guide of claim 1, wherein said fastening elements are rivets.

5. The guide of claim 1, wherein said retention of plastic to the cage skeleton is a chemical bonding.

6. A bearing assembly comprising:
 an outer ring;
 an inner ring;
 a cage assembly including:
  a first cage half including at least one first metal cage skeleton, the at least one first metal cage skeleton:
   exposed to contact with the rolling elements; and,
   including a first outer axial surface and a first inner axial surface, at least two first arched segments and at least two first flat land surfaces; and,
  a second cage half including at least one second metal cage skeleton the at least one second metal cage skeleton:
   exposed to contact with the rolling elements; and,
   including a second outer axial surface and a second inner axial surface, at least two second arched segments and at least two second flat land surfaces; and,
 a plurality of rolling elements retained by said at least one first and second metal cage skeletons and disposed between said outer and inner rings, wherein:
  the at least two first and second arched segments are aligned to form rolling element pockets;
  a plastic is retained to at least one of said first outer axial surface or said second outer axis surface;
  the plastic wholly encompasses the at least one of said first outer axial surface or said second outer axial surface around an entire respective circumference of the at least one first or second cage skeleton;
  a series of fastening holes extend through an axial length of the first cage half and through the at least two first flat land surfaces, aligning with fastening holes extending through an axial length of the second cage half and through the at least two second flat land surfaces; and
  a of respective fastening elements inserted into each of said fastening holes, align the at least two first and second land surfaces, and fixedly join the first and second cage halves together.

7. The assembly of claim 6, wherein said cage skeleton is formed of stamped steel.

8. The assembly of claim 6, wherein said plastic is PEEK.

9. The assembly of claim 6, wherein said fastening elements are rivets.

10. The assembly of claim 6, wherein said retention of plastic to the cage skeleton is a chemical bonding.

* * * * *